Dec. 3, 1935. G. E. ROBERTS Re. 19,783

COMPRESSOR

Original Filed May 26, 1932 2 Sheets-Sheet 1

INVENTOR.
GEORGE E. ROBERTS
BY
Mason, Anderson & Liddy
ATTORNEYS.

Dec. 3, 1935. G. E. ROBERTS Re. 19,783

COMPRESSOR

Original Filed May 26, 1932 2 Sheets-Sheet 2

INVENTOR.
GEORGE E. ROBERTS
BY
Munn, Anderson & Liddy
ATTORNEYS.

Reissued Dec. 3, 1935

Re. 19,783

UNITED STATES PATENT OFFICE 19,783

COMPRESSOR

George E. Roberts, Burbank, Calif., assignor of one-fourth to Rudolph A. Rick and one-fourth to Forest O. Rick, both of Rhinelander, Wis.

Original No. 1,931,207, dated October 17, 1933, Serial No. 613,735, May 26, 1932. Application for reissue August 13, 1934, Serial No. 739,707

3 Claims. (Cl. 103—139)

This invention relates to rotary compressors, and while it is designed more especially for use in systems of mechanical refrigeration, it can also be advantageously employed in hydraulic transmissions and wherever it may be desired to circulate or compress fluid in a simple and efficient manner.

One of the objects of the invention is to provide a rotary compressor made up of the minimum number of parts, it being possible to readily assemble them.

Another object is to provide a compressor of this type which will not easily get out of order, and can be made at low cost.

A still further object is to provide a compressor which will operate efficiently at a comparatively slow speed, it being possible to obtain efficient results from a six-inch rotor operating as low as 60 R. P. M. This is accomplished by increasing to a maximum the sealing areas of the coacting walls or working faces of the stator and the rotor without imposing excess frictional loads thereon and by constructing the rotor to function as an inertia mass to counteract to an appreciable extent the retarding effect of frictional loads or drags imposed upon said areas by the impeller vanes and other frictional factors. I have discovered that by making the face width of the rotor relatively broad in proportion to the outside diameter of the rotor and by interposing said rotor between two fixed walls of the stator housing so that the side faces of the rotor are substantially in constant contact with the respective inner faces of said fixed walls, the capacity area of the working chamber of the compressor remains constant, and in consequence thereof uniform volumetric efficiency is maintained. A compressor of this class is purposely designed to give constant volumes per revolution of the rotor. To obtain a reduced flow, it is to be understood that this can be accomplished by reducing the speed of the rotor. However, at any fixed speed of the rotor, the discharge capacity of the compressor remains constant due to the fact that the rotor is closely interposed between said fixed walls of the stator and, therefore, cannot move axially. The capacity remains constant also because the width of the compressing space is not variable at any period in the rotation of said rotor between the fluid intake side of the stator and the discharge side thereof. The intended high volumetric efficiency from a six-inch rotor at an operating speed as low as 60 R. P. M. is further made possible because of the manner in which the impeller vanes are mounted upon the rotor. To produce a highly effective fluid seal between the stator, the rotor and the vanes, it is intended that the vanes freely move axially of the rotor and relatively to the cam side of the stator so that their adjacent fluid sealing edges can be effectively advanced against the coacting face of the stator wall.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed within the scope of what is claimed without departing from the spirit of the invention.

In the accompanying drawings, the preferred form of the invention has been shown.

In said drawings.

Figure 1:
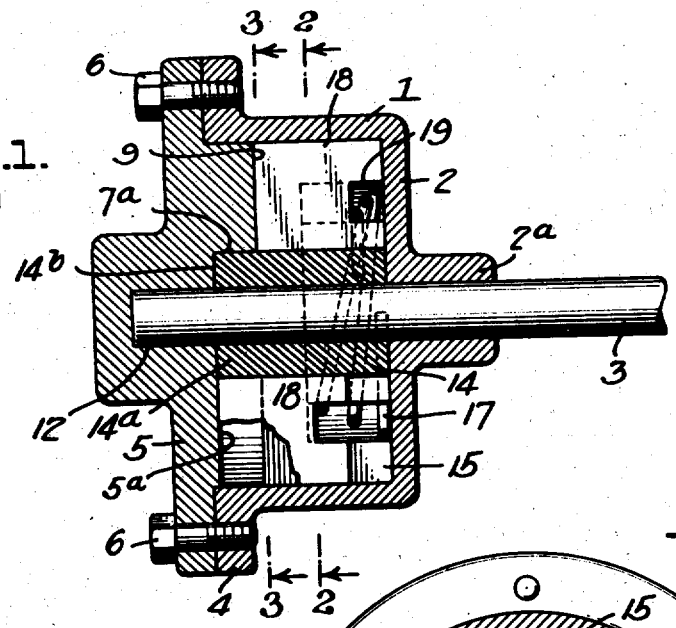
Figure 1 is a central longitudinal section through the compressor showing one of the impeller vanes broken away at the working space of the stator.

Referring to the figures by characters of reference, 1 designates a stator body which is preferably cylindrical. One end of the body is closed by a head 2 which can be integral therewith and provides a bearing 2a for the shaft 3 of the rotor. The other end of the body has an annular flange 4, to which a removable head 5 is detachably secured by means of bolts or other suitable devices, indicated at 6. This head is formed with an inwardly offset portion 7 which forms an annular abutment, the ends 8 of which are inclined toward the flat intermediate surface 9 of said portion 7, the latter and said ends 8 representing approximately one-half the face area of that part of the head 5 which confronts the inner face of head 2. One or more ports 10 can open through each inclined or deflecting end 8 of the portion 7, and these can be in communication with pipes 11, one of which can constitute an inlet for fluid to be compressed while the other constitutes the outlet for the compressed fluid.

The removable head 5 has a socket 12 constituting an end bearing, the same disposed in axial alinement with the aforementioned bearing 2a for the shaft 3. Secured to this shaft between the heads 2 and 5 is a rotor 13, the flat face 13a of which fits snugly against the flat face 9 of the portion 7. The hub 14 has a portion 14a which extends from said surface 13a of the rotor, the flat face 14b of which abuts against the inner flat face 5a of head 5, its periphery having a tight working fit against the inner arcuate surface 7a of said portion 7.

Figure 2:
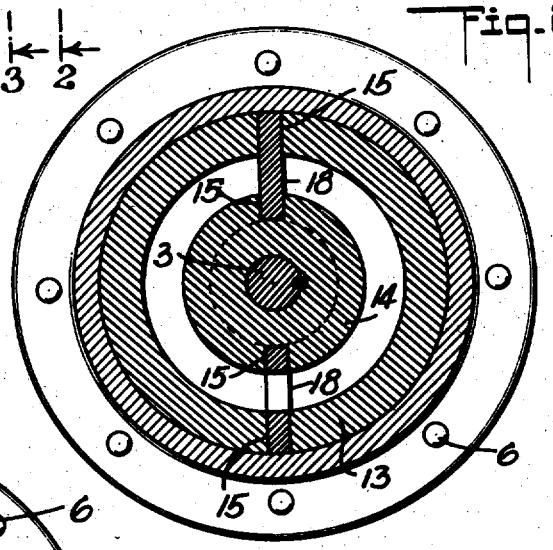
Figure 2 is a section on line 2—2 of Figure 1.
Figure 3:
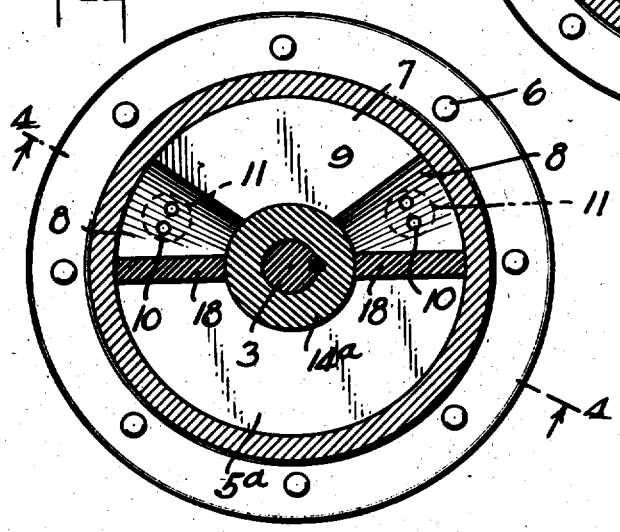
Figure 3 is a section on line 3—3 of Figure 1.
Figure 4:
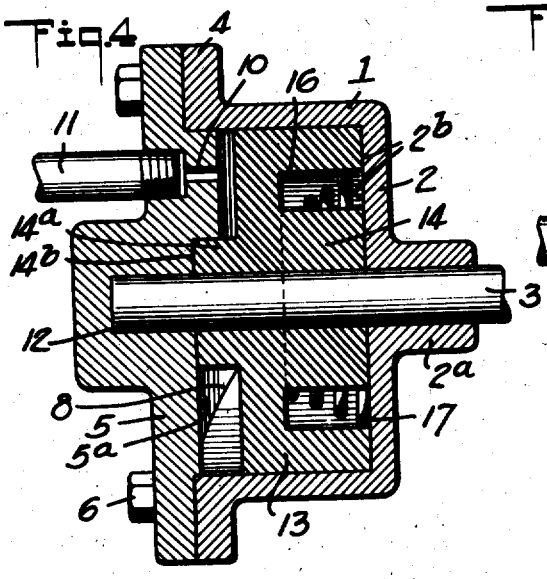
Figure 4 is a section on line 4—4 of Figure 3.
Figure 9:
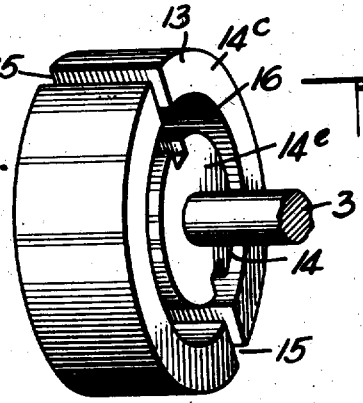
Figure 9 is a perspective view of the rotor looking toward the opposite side thereof from that shown in Figure 7.
Figure 10:
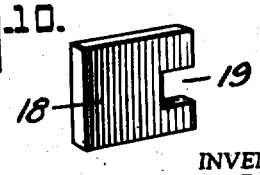
Figure 10 is a perspective view of one of the impeller vanes.

The rotor is provided with diametrically opposite slots 15 extending therethrough from the periphery of the rotor to a point inwardly of the periphery of the main body portion of the hub 14, as shown in Figures 2 and 9. These slots are intersected by a deep circular channel 16 formed in that face of the rotor nearest the head 2. This channel is concentric with the rotor, provides a seat for a coiled spring 17 which bears at one end against the inner flat face 2b of head 2 and normally thrusts at its outer end against the inner end wall of the channel. Slidable within each of the slots 15 is a rectangular plate 18 constituting an impeller vane. Each blade extends from the inner wall of its slot outwardly to the periphery of the rotor and that end of the blade or vane nearest the head 2 is recessed at 19, so as to straddle the adjacent convolutions of the spring 17. Thus the one spring serves to hold both vanes normally pressed toward head 5. Consequently, as the rotor is operated, each vane will successively ride over one inclined terminal 8 of the abutment-forming portion 7, so as to place the spring under compression, then along the flat surface 9 of said portion, at which time the spring is further compressed, and subsequently down the other inclined terminal 8 and along the surface 5a of the head 5, the latter representing the other half of the face area of said part of the head which confronts the aforementioned inner face of head 2. During this movement of each vane, fluid in advance thereof will be expelled through the ports 10 first reached by the vane, and as the vane moves away from the other terminal of the abutment portion the fluid to be compressed will be sucked through the port or ports in said terminal and positioned behind the vane. By providing two vanes, as shown, a continuous stream of fluid can be delivered under pressure from the stator. It has been found, in practice, that a compressor constructed as described can be made at low cost and will operate efficiently at a low speed and without overheating. Importance is attached to the fact that the compressor is made up of very few parts and, consequently, will seldom require repairs. All of the parts are readily accessible by removing the head 5, and in the event of excessive wear of the vanes, those parts can be easily removed without requiring the services of a skilled mechanic.

Figure 5:
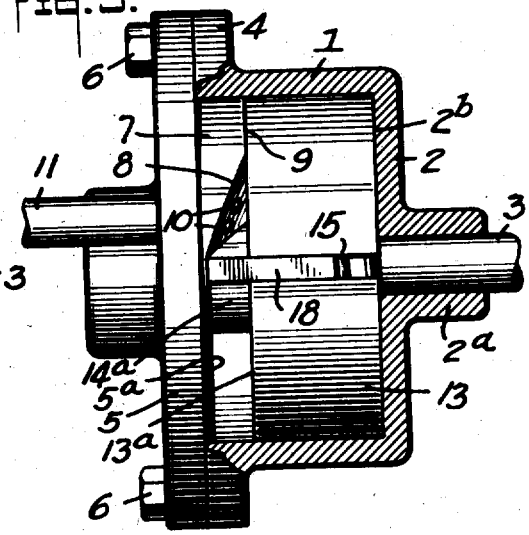
Figure 5 is a view partly in edge elevation of the compressor with parts of the stator in section.
Figure 6:
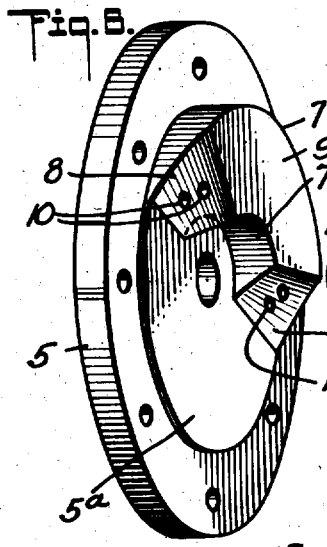
Figure 6 is a perspective view of one head of the stator.
Figure 7:
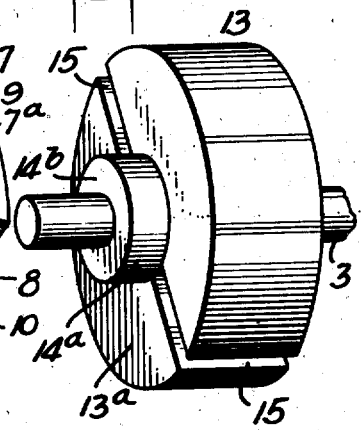
Figure 7 is a perspective view of the rotor.
Figure 8:
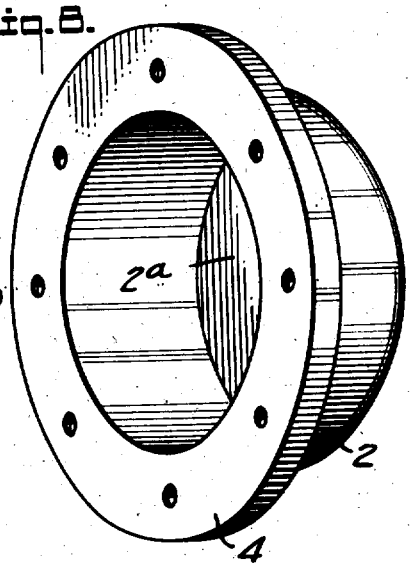
Figure 8 is a perspective view of the body portion of the stator showing the other head.

It will be appreciated, on reference to Figures 1, 7, 6 and 8, that the flat annular face 9 of the abutment portion 7 is disposed in parallel relation to the flat face 13a of the rotor 13, and that the flat face 14e and the flat face 14c at the opposite side of the rotor are parallel to the inner flat face 2a of the head 2, the said faces 14e and 14c being in the same vertical plane with each other. Upon particular reference to Figures 1 and 5, it will be observed that the peripheral face width of the rotor is co-extensive with the distance represented by a straight line from the face 9 to the face 2a and parallel to the horizontal axis of the rotor. It follows therefrom that said face 13a will constantly operate against the face 9, whereby to provide an effective fluid seal therebetween and thus prevent fluid leakage between the portion of increased width of the working chamber of the stator and the portion of lesser width of said chamber. The portion of increased width will be herein referred to as the suction and pressure space. The portion of lesser width which is wholly occupied by the wall thickness of the rotor, will hereinafter be referred to as the fluid-sealing space. It will also be observed that during operation of the rotor and because of the manner in which the vanes are mounted, the inner transverse edges of the vanes will bear tightly against the smooth peripheral surface of the hub portion 14a, as will be appreciated on reference to Figure 1, thus sealing the space therebetween to prevent leakage of fluid therethrough. The extension 14a of the hub is of smaller diameter than that of the main body portion of the hub, and it will be appreciated, upon again referring to Figure 1, that the grooves 15 formed in said main body portion terminate at a point inwardly of the inner wall of the channel 16, thus leaving the extension 14a smooth as aforestated and as is necessary to a proper sealing of the space between same and the adjacent edge of the impeller.

Again referring to Figure 1, it will be observed that the left hand end of the lower one of the vanes 18 therein illustrated has been yieldingly advanced by the spring 17 to an effective fluid-compressing position where its radial edge nearest the head 5 is in flat sealed contact with the large-area flat surface 5a of said head 5. The flat surface 14b of the hub is in fluid-sealed contact with the same flat surface 5a, where it is partly embraced by the bearing surface 7a. In consequence of the employment of the means aforestated for sealing the vane, it will be further noted that on movement of the lower vane to the position just described, an effective seal is also established between the vane, the face 5a and the inner wall of the stator, so as to prevent leakage of fluid past these lines. The seal thus formed and the seal formed in a somewhat similar manner by the companion vane of the rotor, and the fact that the face width of the rotor is equal to the shortest width of the working space which separates the head 2 and face 9 from each other, and is broad relatively to the outside diameter of the rotor, are all contributing factors that co-act to provide a rotor construction in which all contact areas are well sealed. The form of the rotor is also such as to give it an inertia value sufficient to counteract, to a considerable extent, the retarding frictional loads and drags imposed upon the contact areas. The construction is, further, such that the capacity area of the working chamber of the compressor will remain constant at all speeds so that uniform volumetric efficiency is maintained at all times. The leakage line that would be expected to give rise to pressure losses in a compressor of this type would be bounded by the surface 5a, the confronting radial edge of the impeller vane that rides thereover, the outer edge of the same vane from a point at the surface 5a to the flat face 13a of the rotor, and the inner edge of the vane where it bears against the smooth peripheral face of the hub extension 14a. As these are all perfectly sealed in the manner stated, no fluid loss can occur at these places, and the suction and pressure space of the working chamber will thus be able to carry its full load without pressure losses. In view of the fact that the rotor has a tight machine fit at its sides with the co-acting stator walls, it follows that the rotor held against movement axially of the stator. In view thereof, the pressure exerted upon the fluid in the suction and pressure space will be constant. The only other leakage that would be expected to occur and give rise to losses in pressure and volumetric displacement would be at the face 9 and the adjacent radial edge of the impeller vanes which ride thereover. As the rotor and stator are perfectly sealed at this last named point, no fluid can pass from the suction and pressure space to the aforementioned fluid sealing space, which is a further contributing factor toward maintaining a very high measure of efficiency and avoiding fluid pressure losses.

I have stated that the distance from the face 9 to the face 2b is equal to the face width of the rotor. It follows that the vanes 18 must, therefore, be co-extensive with the face width of the rotor so that they will be wholly contained within the slots of the rotor, when the vanes are acted upon by said face 9. It follows also that the width of the vane 18 is co-extensive, with the face width of the face 9 on any line passing across said face 9 radially of the axis of the rotor. This insures a proper sealing of the space between the face 9 and the flat side 13a of the rotor.

The faces 5a and 9 are parallel to each other, and they are also in different vertical planes, so as to allow for the intended maximum extent of movement of the vanes axially of the rotor and into sealed engagement with the face 5a of the head 5. The low ends of the inclines 8 are in substantial alinement with each other and offset from a line drawn through the axis of rotation of the rotor, so that the vanes which are diametrically opposite each other will approach the inclines on lines parallel to all surfaces thereof which are radial to the axis of the rotor. This is an order that the radial edges of the vanes which confront the head 5 will evenly contact with the inclines and thereby prevent any sudden thrust of the corners of the vanes against the inclines. This relieves the vanes of undue wear and insures to a large extent against leakage between the vanes and the co-acting contact surfaces of the head 5.

Although this device has been described as primarily for use as a compressor, it is also to be understood that it can be used as a transmission unit.

What is claimed is:

1. In a rotary pump, the combination with a stator; a rotor; axially movable vanes on the rotor; and means on the stator for moving the vanes axially in one direction; of resilient means common to all the vanes for exerting a constant force against them to move same axially in the opposite direction; and means for operatively mounting the resilient means within the rotor.

2. In a rotary machine of the class described, a stator having a rotor chamber provided with a concentrically mounted rotor and said rotor having axially reciprocal vanes; cam means for moving the vanes axially in one direction; and a coil spring mounted in the rotor concentric to the axis thereof and engaging all of the vanes to move same in an opposite direction and against said cam means.

3. In a rotary machine of the class described, a stator having a cylindrical bore and oppositely disposed heads, one of said heads having a concentric abutment on its inner face, said abutment having terminal cam faces; a plurality of axially movable vanes carried by the rotor and adapted to co-act with said abutment, the width of each vane being substantially equal to the axial distance between the intermediate portion of the abutment and the other head, the cam faces co-acting with the vanes to respectively cause and enable the vanes to approach and ride over the intermediate portion of the abutment and then leave same in rotation of the rotor; and a coiled spring mounted in the rotor concentrically thereof and provided with portions engaging the vanes to constantly exert a yielding pressure thereagainst axially of said rotor and toward said abutment.

GEORGE E. ROBERTS.